Dec. 26, 1933.    O. V. KRUSE    1,941,357
FLUID CONTROL SYSTEM
Original Filed March 18, 1930    2 Sheets-Sheet 2
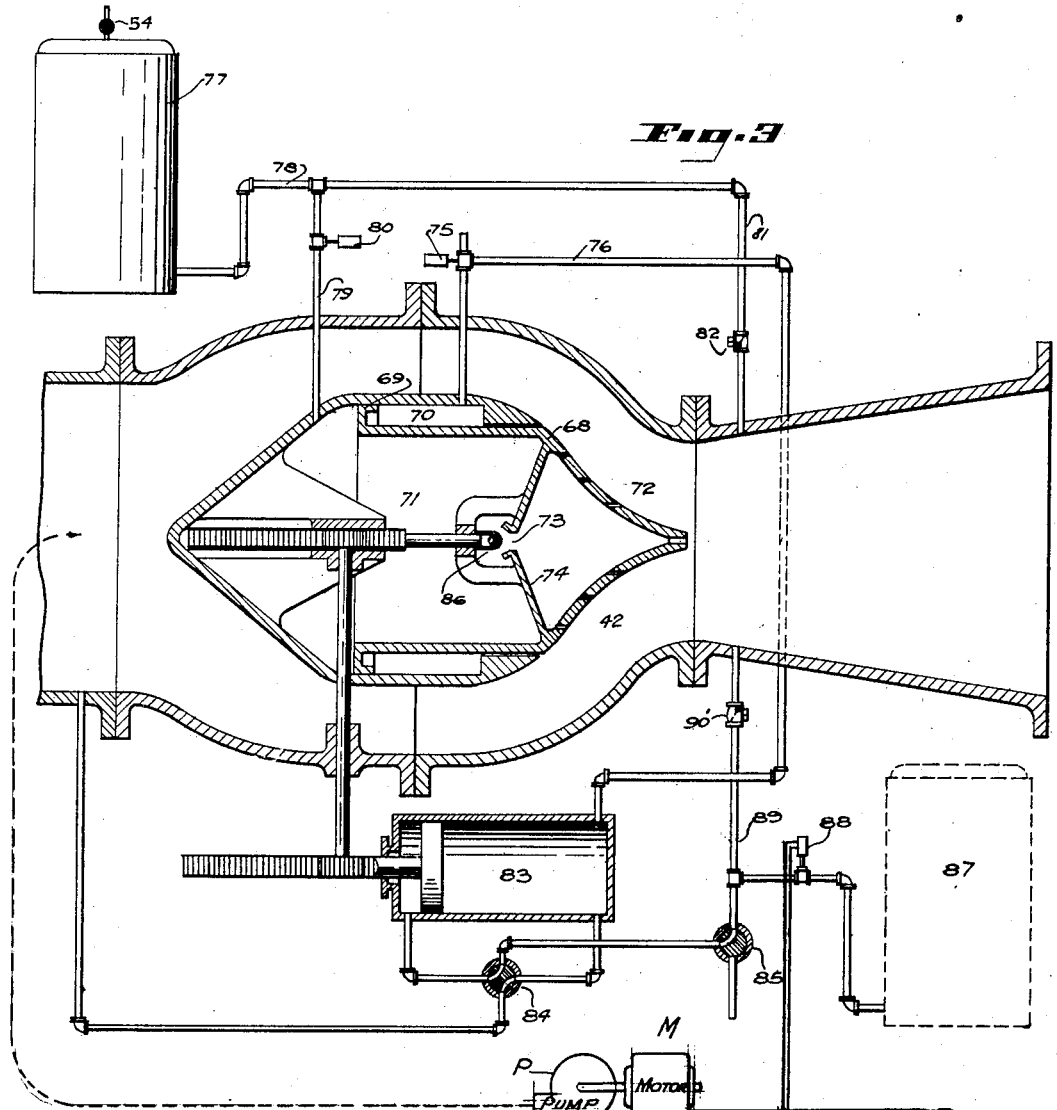
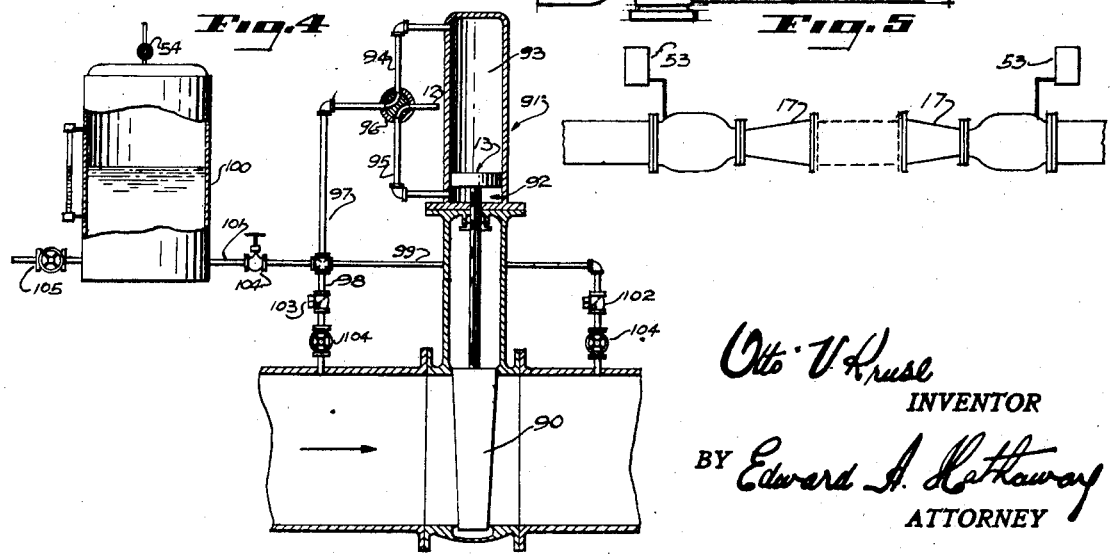
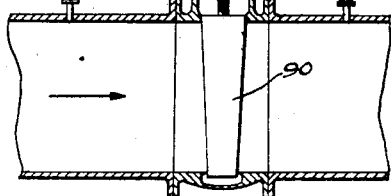
INVENTOR
BY Edward A. Hathaway
ATTORNEY Patented Dec. 26, 1933

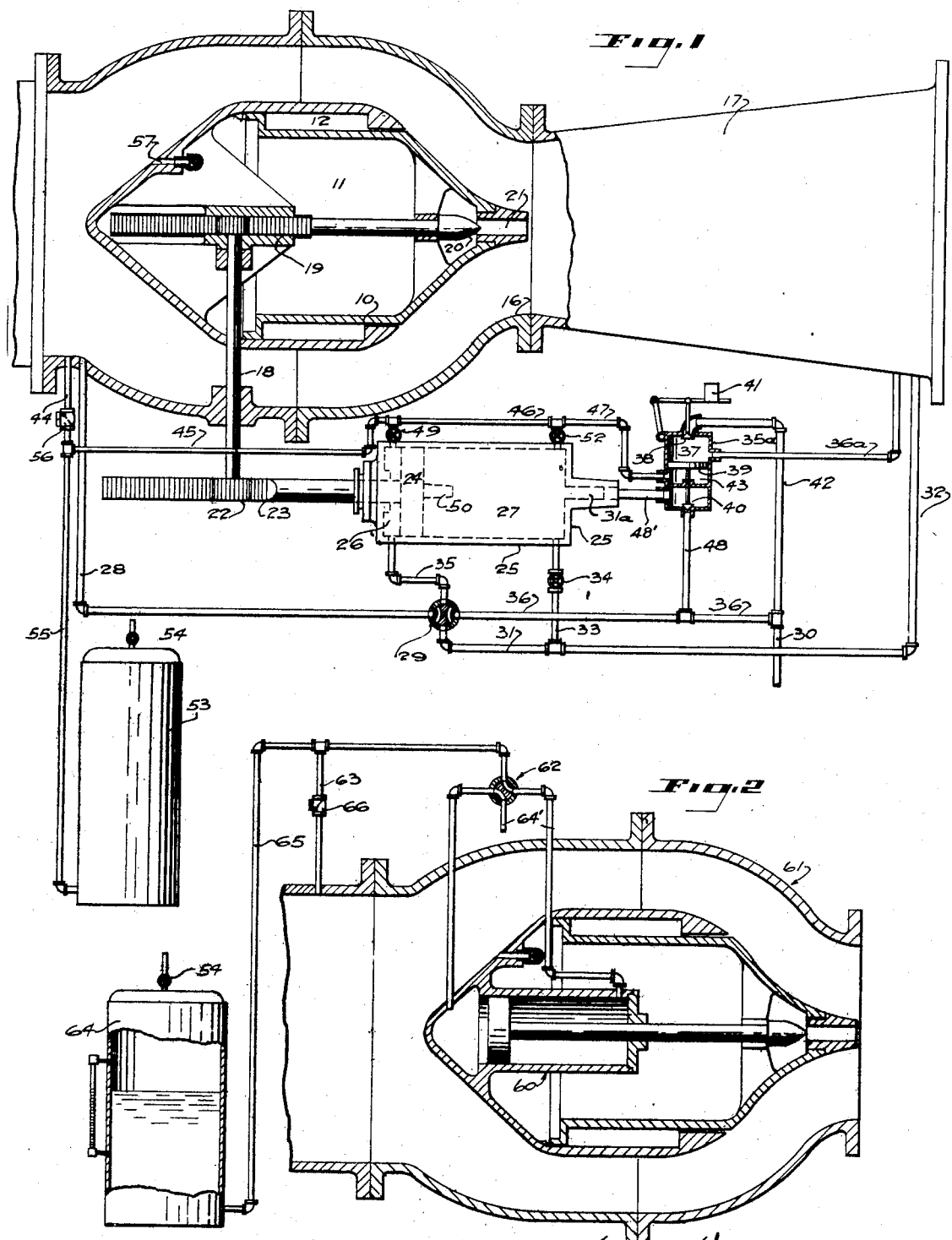

1,941,357

UNITED STATES PATENT OFFICE 1,941,357

FLUID CONTROL SYSTEM

Otto V. Kruse, St. Davids, Pa., assignor to I. P. Morris and De La Vergne, Inc., a corporation of Delaware Application March 18, 1930, Serial No. 436,738
Renewed November 23, 1931

28 Claims. (Cl. 137—139)

This invention relates to fluid conduit control means and particularly to an improved combination of a valve and operating control mechanism therefor.

An object of my invention is to provide an improved arrangement whereby a valve mechanism, normally operated by pressure fluid from a given source, may be closed and retained in closed position during an emergency such as when the normal or given source is either lost entirely or dropped so far or rapidly below normal that it is practically impossible to effect closure of the valve from this source. Another object is to provide an improved arrangement whereby the normal source of pressure is taken directly from the pipe line and yet upon failure of the pipe line pressure the valve may still be closed by fluid pressure.

A further object is to provide improved means for closing the valve automatically by fluid pressure even in the absence of normal pipe line pressure. A still further object is to provide an improved arrangement whereby during the existence of normal conditions the emergency apparatus automatically is placed in a potential condition for closing the valve when the conduit pressure fails and for holding the same closed either for a relatively prolonged period or until normal pressure conditions are restored. In this respect it is a specific object of my invention to provide means for accumulating a potential source of operating pressure fluid which is supplied from the conduit during normal pressure conditions therein and without interfering in any way with normal operation of the valve, but at the same time being simultaneously operatively connected to the control system.

It will be seen from the disclosure herein that the control arrangement and modifications thereof are applicable to various forms of hydraulically or fluid operated valves, for example, a hydraulically operated butterfly valve, special forms of butterfly valves such as where the operating gear is attached to the rim of the disc, rotary valves of the spherical or plug cock type, plunger and needle valves, such as the Johnson type or any other form where fluid operation is used. Certain specific forms of these valves are either shown herein or in my copending applications, Serial Nos. 85,815 and 73,614.

One application of my improved arrangement is where a valve, located in a pipe line, is arranged to be closed automatically in the event of a break in the pipe line. The break may be of sufficient magnitude to reduce the pressure in the entire pipe to a point where it is no longer great enough to close the valve. Another example, is a check valve connected with a centrifugal pump where the discharge from the pump is delivered into the system of piping without any connected storage to support the pressure in the pipe line when the pump is not running. In this case the running of the pump is the sole source of pressure supply and a shut-down of the pump immediately drops the pressure in the entire system. With the pressure practically entirely lost in such a system there may be a tendency for the piping to drain back to the pump under some pressure but not sufficient to close the check valve. With my improved arrangement, means are provided for closing the check valve during this emergency regardless of the amount or duration of the pressure drop in the pipe line. A further use under somewhat different conditions would be to protect a valve against becoming inoperative when it normally receives its operating force from a source other than a pipe line.

These few examples merely partially illustrate the practical use of the arrangement as it is of course obvious to those skilled in the art that my improved arrangement, or modifications thereof, have a great many applications, particularly in any field of use where operating pressure is normally taken from the pipe line in which the valve is located.

Other objects and advantages will be apparent to those skilled in the art from the following description of the accompanying drawings, in which:

Fig. 1 is a partial sectional view of the main valve and the controls therefor, shown partly in elevation and in section;

Figs. 2, 3 and 4 illustrate other forms of valve mechanism operated by my improved control arrangement or modifications thereof; and Fig. 5 is a view showing two valves disposed in a pipe line in such relation to each other that normal flow in either direction may be had but upon drop in line pressure one or the other of the valves is closed thus protecting the line. Parts of the controls are omitted for clearness.

For purposes of illustration I have shown for instance, in Fig. 1, a Johnson type of valve having a cylindrical valve specifically in the form of an internal plunger 10 telescopically arranged with an internal casing to provide fluid pressure operating means in the form of a central or internal chamber 11 and an annular chamber 12, the plunger moving axially to seat in a restricted 110 throat 16 of a venturi 17, and hence shut off flow between the up and downstream pipes of the conduit in which the valve is disposed. The operation of this valve is well known and hence it will suffice to say that valve movement is brought about through rotation of an operating shaft 18 connected, through a rack and pinion 19, to an axially movable plunger nose pilot valve 20 which controls the nose orifice 21. The operating shaft in the illustration has a pinion 22 engaging a piston rod rack 23. The rack rod has a piston 24 disposed in a cylinder 25 to form operating chambers 26 and 27. The normal connections for operating this piston include a connection 28 adapted when control valve 29 is set for closing the main valve, to supply pressure fluid to cylinder chamber 26 from the pipe line, specifically the upstream pipe. [The figure shows control valve 29 in neutral position.] When the valve 29 is turned to supply pressure to chamber 26, cylinder chamber 27 is connected through operating control valve 29 to a drain 30 thus closing the main valve. At the same time cylinder chamber 27 is also connected to the pipe line beyond the main valve, at the enlarged portion of the venturi, as by pipes 31 and 32. To open the main valve operating valve 29 is turned to connect supply pipe 28 with pipe 31 and accordingly supply fluid pressure to cylinder chamber 27 through pipe 33 which may be provided with a normally open manually operable shut-off valve 34. At the same time cylinder chamber 26 is connected to drain 30 through pipes 35 and 36. If this opening operation is required at a time when pressure in venturi 17 is substantially below normal pressure whereby blow-off valve 40 will be opened, it will be noted that fluid pressure can accumulate in chamber 27 due to tapered plug 50 being disposed within passage 31a. Fluid flow from chamber 27, as through passages 31a, 48' and blow-off valve 40, is thus prevented or sufficiently restricted so that accumulated pressure will move piston 24 a sufficient distance to the left to cause opening movement of pilot valve 20 and the main plunger valve. With the main plunger valve initially opened or cracked it is seen that fluid pressure from the upstream side may flow into the venturi to build up normal pressure therein whereupon the blow-off valve may be manually reset to permit continued opening movement. If during the opening operation pressure in venturi 17 is excessively below the pressure in supply pipe 28 whereby there might be an abnormal drainage of supply fluid through pipe 32 to the venturi, this would be prevented by the use of a check valve such as 90' in Fig. 3, or if desired, shut-off valve 34 may be closed thus allowing opening fluid pressure to be supplied from the upstream pipe through supply pipes 44, 45, and 46 and a valve 52. Fluid pressure thus supplied cannot drain off through pipe 47 to pipe 36a because normal operation of blow-off valve 35a does not permit communication between these pipes. It is also seen that this latter manual opening operation, involving pipe 46 and valve 52, permits the supplying of fluid from the automatic reserve source 53 as by pipes 55, 45, and 46. During these manual opening or closing operations of the plunger it will of course be understood that movement of piston 24 effects control of the plunger orifice through pilot valve 20 and in a well known manner causes the plunger to move to open or closed position depending upon whether the plunger orifice is closed or opened. Leakage through the plunger fit provides, of course, the necessary supply of pressure fluid to the operating chambers. For example with pilot valve 20 open, fluid pressure in the internal chamber 11 would discharge through passage 21 to the region of lower pressure in venturi 17 thus allowing the fluid pressure in annular chamber 12 to move the plunger in an opening direction. On the other hand when pilot valve 20 is closed fluid pressure accumulates in the internal chamber 11 which is supplied through the plunger-fits communicating with annular chamber 12 and central chamber 11. With equal pressures in the central and annular chambers, sufficient differential pressure forces are created to close the main valve.

With the four-way cock or control valve 29 in neutral position, as shown, pressure supply pipe 28 and drain connection 30 are cut off. Under these circumstances, and assuming the plunger to be in closed position with a deficiency of pressure in the downstream pipe, if the downstream pressure is now restored it will be communicated through pipes 32 and 33 directly into chamber 27. As soon as chamber 27 contains pressure substantially equal to the pressure in chamber 26 piston 24 will be moved to the left by virtue of the exposed stem 23, hence opening the main valve in the usual manner. Opening of the main valve may be made faster by turning the operating valve 29 beyond the neutral position and actually connecting chamber 26 to drain. It is thus seen that the valve is adapted to open automatically in accordance with restoration of the downstream pressure.

In order to close the main valve automatically upon occurrence either of complete failure of the downstream pressure or an appreciable drop thereof, there is provided a trip valve generally indicated at 35a. This trip valve is normally held closed by downstream pressure supplied through a pipe 36a to a chamber 37 thereby holding a valve 38 closed and likewise holding piston 39 in down position whereby a valve 40 is closed. When downstream pressure reaches a predetermined minimum, valve 38 is opened by its weighted lever 41 thereby connecting chamber 37, as by pipe 42, to drain 30. Piston 39 and valve 40 are thereupon opened by fluid pressure in chamber 43 which is supplied with upstream pressure from pipe 44 through pipes 45, 46 and 47. Upon opening of valve 40 chamber 47 discharges to drain 30 as by pipes 48', 48 and 36. During this time chamber 26 is being supplied with upstream pressure through pipes 44 and 45, and manually adjustable throttle valve 49, thereby moving piston 24 to the right and accordingly moving pilot valve 20 to close orifice 21 and thus effect closure of the main valve. Movement of piston 24 is retarded when the right end of cylinder chamber 27 is reached by the provision of a suitable tapered throttling stem 50 which enters the discharge passage 31a and gradually restricts flow from chamber 27. Upon restoration of downstream pressure and closure of trip valve 38, drain valve 40 is closed thereby permitting fluid pressure to build up in chamber 27 as through pipes 32 and 33 and thus move piston 24 to the left. The pressure supply to chamber 27 is supplemented by flow of fluid from pipe 44 through pipes 45 and 46 and a manually adjustable throttling valve 52. Throttle valves 49 and 52 are normally adjusted to permit sufficient flow to chamber 26 without undue discharge of fluid through chamber 27 when the latter is vented.

It is seen so far that either manual control or automatic control of the plunger during failure and restoration of downstream pressure, is dependent upon the existence of upstream pressure. In case of complete failure in the whole pipe line including the upstream as well as the downstream pipes, I have provided improved means for obtaining a potential source of operating pressure fluid adapted to be used during such an emergency and which is brought into its potential operating condition during the existence of a normal supply of operating pressure such for example as the pressure in the pipe line and especially normal pressure in the upstream pipe. The arrangement is such that the automatic or manual operations just previously described are adapted to function in their normal manner irrespective of a complete loss, or appreciable loss, of the pipe line pressure. To accomplish this a pressure chamber 53, having a suitable valve controlled pipe 54 for charging the tank with compressed air, is supplied with fluid pressure from the pipe line as through a pipe 55 connected with pipe 44. A check valve 56, disposed in pipe 44, permits flow of pressure fluid from the upstream pipe to chamber 53 during normal pressure conditions in the pipe line but prevents reverse flow into the pipe line upon the complete drop of pressure therein. A potential source of pressure fluid is thus accumulated in tank 53. It will be noted that check valve 56 is disposed between the main valve casing and pipe 45 thereby permitting fluid pressure to be supplied from accumulator 53 through pipes 55 and 45 to the trip valve 35a and also to operating cylinder 25.

With the above arrangement it is seen that the main valve may be closed automatically either upon loss of pressure in the downstream pipe or complete loss of pressure in the pipe line and that the potential source of operating pressure fluid automatically takes the burden of supplying pressure to the operating cylinder 25, due to check valve 56 and the pipe arrangement 45, 55. With the potential supply thus automatically connected, the remaining valve closing operations are the same as previously described. It will be understood that the capacity of tank 53 or any suitable chamber that might be used is designed to be of sufficient capacity to permit either a prolonged closure of the main valve or a single automatic closure with a limited number of subsequent manual controlled operations thereof.

In certain installations it is desirable to protect a section of the pipe line regardless of the direction of flow therein, this being illustrated in Fig. 5. To accomplish this I use two valves incorporated in the pipe line spaced apart as is necessary to protect the desired extent of pipe line and disposed in opposed relation so that their plungers point toward each other, assuming a plunger type valve is used. Any suitable valves having the necessary characteristics may be employed but for purposes of specific illustration, reference will be made to the preferred forms as shown in Figs. 1 and 2, although the other forms may also be used. To maintain the valves open during normal amounts of flow in either direction, but still effect automatic closure of one or the other in accordance with loss of pipe line pressure, each main valve is provided with a check valve controlled passage 57 adapted to permit flow from central chamber 11 to the pipe line only when flow is against the plunger. Fluid in the pipe line may thus flow in the left hand direction without effecting closure of the left valve plunger under any conditions of pressure drop, although the right hand plunger would be able to be closed upon such pressure drop. On the other hand, fluid flow in the opposite or right hand direction would not permit closure of the right hand valve under any conditions of pressure drop, but would permit closure of the left hand valve upon the loss of line pressure. The operation of the valve which is adapted to close is the same as when the valve is used alone as previously described. Hence, it is seen that with two such valves as shown in Fig. 1, disposed in opposed relation to each other and each provided with a control and potential pressure supply arrangement as shown, pipe line fluid may flow in either direction and still the line would be fully protected in case of complete loss of line pressure.

In the modification of Fig. 2 an operating piston and cylinder 60 are disposed within the main valve 61, which is a form of Johnson valve. This arrangement has a pilot valve nose control operated by the piston. Operating fluid pressure therefor is controlled by a manually operable four-way valve 62 adapted to connect either end of the cylinder to the upstream pressure as by pipe 63 or to exhaust one or the other end of said cylinder end to a drain 64′. To provide the potential source of operating fluid and to permit the same to be placed in operative condition automatically during existence of pipe line pressure, and to supply the control system automatically when an emergency arises, a tank or other suitable chamber 64 is connected to pipe 63 as by a pipe 65. A check valve 66 permits flow of fluid from the pipe line both to tank 64 and cylinder 60 and prevents reverse flow into the pipe line upon loss of pressure therein. The operation of this modification is believed to be obvious in that manipulation of control valve 62 will effect either opening or closure of the main valve.

In the modification shown in Fig. 3 a plunger form of check valve is employed. The main plunger 68 slides within the inner casing cylinder 69 and forms therewith two operating chambers 70 and 71. Upon reverse flow fluid pressure passes into chamber 71 through a series of orifices or ports 72 and an opening 73 in the center of a partition 74, a chamber being formed between the partition and plunger nose. The exhaust of pressure chamber 70 is controlled by a solenoid actuated valve 75 which also controls pipe 76 leading from one end of an operating motor to be described. The solenoid valve is opened when the power for the electric pump motor or other prime mover is interrupted. The solenoid may be energized with current from the same source to which the electric motor is connected so that upon failure of the electric current the solenoid is de-energized and the solenoid valve opened or in the case of any other type of engine suitable means are provided for energizing and de-energizing the solenoid as described.

It is thus seen that upon reverse flow, which is caused by stopping of the pump as when motor current fails, the main valve closes as a check valve and remains closed as long as there is an interruption of power, providing that there is available pressure in the main pipe line beyond the valve. In this way pressure is supplied to the internal chamber 71 while the annular chamber is open through the solenoid controlled valve. With the construction so far described if the interruption of flow causes an instant drop in pressure in the main pipe line, the valve would not close as there would be no supply to chamber 71. However, with my improved arrangement I have connected the potential pressure means, in the form of an accumulator tank 77, to chamber 71 as by pipes 78 and 79, pipe 79 being normally closed by a solenoid controlled valve 80 connected to the pump motor in the same manner as solenoid controlled valve 75. With solenoid 80 closed, an interruption of power simultaneously opens both solenoid valves 75 and 80 resulting in exhaust of pressure from chamber 70 and supply of pressure from accumulator 77 to chamber 71. Pressure fluid is supplied to and maintained in the accumulator tank during normal pressure conditions in the pipe line as by a pipe connection 81 which has a suitable check valve 82 therein to permit flow from the pipe line to the accumulator but not in the reverse direction.

The operating mechanism for controlling the main valve by hand and for maintaining check valve service without the accumulator tank consists of a piston cylinder motor 83 and manually controlled operating valves 84 and 85 described in my copending application, Serial No. 73,614. The detailed description of this control arrangement is not therefore necessary and it will suffice to say that upon movement of the piston in motor 83 a pilot valve 86 is adapted to variably control the central passage 73 to effect opening and closing as is well understood.

An alternative or permanent means for supplying emergency or accumulator tank pressure is shown in dotted lines in Fig. 3, wherein an accumulator tank 87 is connected through a solenoid controlled valve 88 to the pipe 89 from which the operating fluid passes through the usual system of pipes and valves into the closing side of the operating cylinder 83. A check valve 90' permits flow from the conduit through pipe 89 and to the motor but prevents reverse flow therethrough. Solenoid 88 is normally closed and is opened simultaneously with solenoid 75 when an interruption of power occurs to motor pump M, P as diagrammatically shown in Fig. 3. The main valve is thereby closed as a check valve whether or not the pressure in the main pipe line is lost. When the accumulator tank 87 is permanently connected in the system as shown it operates both as an auxiliary and emergency source to the normal potential source in tank 77. If the normal potential source 77 should fail for any reason then the auxiliary potential source 87 will automatically function in the manner just described.

In the modification shown in Fig. 4, a usual commercial form of gate valve is shown as having a sliding gate 90 operated by a piston cylinder motor 91, which is provided with two operating chambers 92 and 93. Supply pipes 94 and 95 for these chambers are adapted to be connected alternatively by an operating valve 96 to a source of pressure fluid, such as the pipe line, as by pipes 97 and 98 or 99. In case of failure of pipe line pressure the operating cylinder is connected to accumulator tank 100 as through pipe 101. Check valves 102 and 103 are adapted to permit flow from the conduit to the operating cylinder 91 or accumulator 100 but prevent reverse flow therefrom to the conduit. There is also provided normally open manually adjustable stop valves 104 in each of the pipes 99, 98 and 101. An external pressure source 105 may, if desired, be used to charge the accumulator tank. Each tank is provided with air supply valve. The operation of this form is believed to be clear from the previous description of the other modifications.

From the foregoing description of the various forms of valves as used with my improved arrangement, it is seen that either automatic or manual closure of the valve may be effected during normal pressure conditions in the pipe lines and that in either case if the pipe line pressure is lost to such a point that normal closure of the main valve cannot be had, still either manual or automatic closure may be effected with my improved potential source of fluid pressure supply. Also that this potential source of accumulated operating pressure is obtained automatically during normal pipe line conditions and without any interference with or control by the normal operation of the main valve and that said source of accumulated pressure is placed automatically in operation only as is necessitated by emergency conditions. During normal operation or pressure conditions fluid may surge or circulate through the piping and accumulating means.

While the foregoing describes various forms which my invention may assume, it will, of course, be understood that other modifications thereof or changes therein may be made without departing from the spirit of the invention as set forth in the appended claims.

I claim:

1. In combination, a valve disposable between up and downstream pipes of a pipe line, means for normally operating said valve by fluid pressure and adapted to maintain the valve in open position during normal pipe line pressure, means providing a potential source of pressure fluid supplied from the pipe line during normal pressure therein, and means whereby upon failure of pipe line pressure said operating means is actuated by fluid pressure from said source.

2. The combination set forth in claim 1 further characterized in that the valve operating means has a fluid connection directly with the pipe line whereby normal operations of the valve are adapted to be operated by pipe line pressure.

3. In combination, a valve disposable between up and downstream pipes of a pipe line, means for operating said valve by fluid pressure automatically in accordance with pressure variations in said pipe line, means providing a source of fluid pressure supplied from the pipe line during normal pressure therein, and means whereby upon failure of pipe line pressure said operating means is actuated by pressure from said source.

4. The combination set forth in claim 3 further characterized in that the means for automatically operating the valve has provision for effecting the operation by fluid pressure in the pipe line.

5. In combination, a valve disposable between up and downstream pipes of a pipe line, means for closing said valve automatically in accordance with pressure conditions in said pipe line, means providing a source of fluid pressure supplied from the pipe line during normal pressure therein, and means whereby upon failure of pipe line pressure said closing means is actuated by pressure from said source.

6. In combination, a valve disposable between up and downstream pipes of a pipe line, means for normally operating said valve by fluid pressure in said pipe line, means providing a source of pressure fluid supplied from and having constant communication with said line during normal pressure conditions therein, and means whereby upon failure of pipe line pressure said operating means is actuated by pressure from said source and said constant communication with the pipe line is automatically closed.

7. In combination, a valve disposable between up and downstream pipes of a pipe line and having inner and outer casings spaced to form a relatively smooth annular fluid passageway, one of said casings having a seat, an axially movable circular valve member engageable with said seat and slidably supported by the other of said casings, means forming fluid pressure opening and closing chambers for moving said valve member to open or closed position, means whereby said valve member is adapted to be normally operated by fluid pressure from said line and to be held in open position during normal flow therethrough, means whereby a potential source of operating fluid pressure may be stored, and means for supplying fluid pressure to said potential source from said pipe line during normal pressure conditions therein and to supply fluid pressure from said source to said closing chamber when pipe line pressure fails thereby to close said valve.

8. The combination set forth in claim 7 further characterized in that said movable valve member is of the differential plunger type having telescopic arrangement with said inner casing to form internal and annular fluid chambers.

9. The combination set forth in claim 7 further characterized in that said movable valve member is of the plunger type having telescopic arrangement with said inner casing to form an internal fluid pressure chamber having a check valve controlled passage allowing fluid flow from the chamber to the pipe line when pipe line flow is against the plunger but closing upon reverse flow.

10. The combination comprising a pipe line having two valves spaced apart therein, and respectively operative in accordance with the direction of flow therethrough, each of said valves having operating means for effecting opening or closing thereof by fluid pressure from said line, means whereby a potential source of operating fluid may be stored for each valve, and means for supplying fluid pressure to said sources from said pipe line during normal pressure conditions therein and supplying fluid pressure from one of said sources to the operating means of its respective valve when pipe line pressure fails.

11. The combination set forth in claim 10 further characterized by the provision of means whereby one or the other of said valves is rendered inoperative automatically in accordance with the direction of flow in the pipe line and the other is rendered operative.

12. The combination set forth in claim 10 further characterized in that said valves are of the plunger type each having a fluid pressure chamber therein provided with a check valve controlled passage adapted to permit fluid flow from the chamber to the pipe line when pipe line flow is against the plunger.

13. The combination set forth in claim 10 further characterized in that said valves are of the plunger type each having a fluid pressure chamber therein provided with a check valve controlled passage adapted to permit fluid flow from the chamber to the pipe line when pipe line flow is against the plunger, and said valves being disposed with their plungers pointing toward each other.

14. In combination, a valve disposable between up and downstream pipes of a pipe line, means for operating said valve by fluid pressure, means for supplying operating fluid pressure for said valve during normal operation thereof, means providing a potential source of pressure fluid, and means whereby upon failure of the normal supply of fluid pressure said potential source of pressure fluid is adapted automatically to operate said valve.

15. In combination, a valve mechanism disposable between up and downstream pipes of a pipe line, means for operating said valve by fluid pressure, means for normally supplying the operating fluid pressure, means providing a potential source of fluid pressure adapted to be supplied from the same source as that from which the normal supply is obtained, and means whereby upon failure of said normal supply of pressure said valve is actuated automatically by fluid pressure from said potential source.

16. In combination, a valve for controlling liquid flow through a liquid conducting pipe, means for moving said valve by liquid pressure, means for normally supplying pressure liquid for operating said valve, means providing a potential source of pressure liquid, and means for operating said valve from either the potential or normal source of pressure liquid supply automatically in accordance with predetermined operating conditions.

17. In combination, a valve for controlling liquid flow through a liquid conducting pipe, means for moving said valve by liquid pressure, means for normally supplying pressure liquid for operating said valve, means providing a potential source of pressure liquid, means for transferring operation of said valve from said normal supply to said potential source automatically in accordance with predetermined operating conditions, and manual controlled means for effecting closure of said valve by liquid pressure supplied from said potential source.

18. In combination, a valve for controlling fluid flow through a pipe, means for moving said valve by fluid pressure, means for normally supplying pressure fluid for operating said valve, means providing a potential source of pressure fluid, means for transferring operation of said valve from said normal supply to said potential source automatically in accordance with predetermined operating conditions, and manual controlled means for effecting closure of said valve by fluid pressure supplied from either said potential source or normal supply.

19. In combination, a valve disposable between up and downstream pipes of a pipe line, fluid pressure operated means for moving said valve, means for normally supplying pressure fluid for operating said valve, means providing a potential source of pressure fluid adapted to operate said valve upon failure of the normal supply, means for transferring operation of said valve from said normal supply to said potential source automatically in accordance with predetermined operating conditions, and manual controlled means whereby said valve may be closed by pressure fluid from the normal supply.

20. In combination, a valve disposable between up and downstream pipes of a pipe line, fluid pressure operated means for moving said valve, means for normally supplying pressure fluid for operating said valve, means providing a potential source of pressure fluid adapted to operate said valve upon failure of the normal supply, means for transferring operation of said valve from said normal supply to said potential source automatically in accordance with predetermined operating conditions, and manual controlled means whereby said valve may be opened by pressure fluid from the normal supply.

21. In combination, a valve disposable between up and downstream pipes of a pipe line, fluid pressure operated means for moving said valve, means for normally supplying pressure fluid for operating said valve, means providing a potential source of pressure fluid adapted to operate said valve upon failure of the normal supply, means for transferring operation of said valve from said normal supply to said potential source automatically in accordance with predetermined operating conditions, and manual controlled means whereby said valve may be opened by pressure fluid from said potential source.

22. In combination, a valve disposable between up and downstream pipes of a pipe line, means for normally supplying fluid pressure to actuate said valve, means for closing said valve by fluid pressure from said normal supply automatically upon occurrence of a predetermined drop in pressure in said downstream pipe, and means providing a potential source of fluid pressure adapted for actuation of the valve automatically upon the failure of said normal supply.

23. In combination, a valve disposable between up and downstream pipes of a pipe line, means for normally supplying fluid pressure to actuate said valve, means providing a potential source of fluid pressure, and means for effecting closure of said valve by fluid pressure supplied from said potential source automatically upon occurrence of a predetermined drop in pressure in said upstream pipe.

24. In combination, a valve disposable between up and downstream pipes of a pipe line, power actuated means for moving said valve, a plurality of sources of valve actuating power one of which is a potential source and the other the normal source, and means whereby upon occurrence of predetermined operating conditions the supply of power is automatically transferred from one of said power sources to the other.

25. In combination, a valve disposable between up and downstream pipes of a motor operated pump pipe line, means for normally supplying fluid pressure to actuate said valve, means providing a potential source of fluid pressure adapted for actuation of the valve upon the failure of said normal supply, and means for effecting the transfer of fluid supply to said potential source including a solenoid controlled valve operated in accordance with the power supply to the pump motor.

26. In combination, a valve disposable between up and downstream pipes of a pipe line, means for normally supplying fluid pressure to actuate said valve, means providing a source of potential fluid pressure for also actuating said valve upon failure of said normal supply, and valve operating means actuated by the fluid pressure from either said potential source or normal supply including a piston and cylinder motor operatively connected to said valve and fluid connections to each end of said cylinder from both the potential source and normal supply, means for transferring operation of said valve from said normal supply to said potential source automatically in accordance with predetermined operating conditions.

27. In combination, a valve disposable between up and downstream pipes of a pipe line, means providing a normal source of fluid pressure for actuating said valve, means providing a potential source of fluid pressure for also actuating said valve, means for operating said valve including a cylinder and piston forming a pair of operating chambers, fluid connecting means from each of said sources to at least one of said chambers, means for transferring operation of said valve from said normal supply to said potential source automatically in accordance with predetermined operating conditions, and means whereby fluid pressure may be supplied from said normal source to said potential source but not vice versa.

28. In combination, a valve disposable between up and downstream pipes of a pipe line, means providing a normal source of fluid pressure for actuating said valve, means providing a potential source of fluid pressure for also actuating said valve, means for operating said valve including a cylinder and piston forming a pair of operating chambers, fluid connecting means from each of said sources to at least one of said chambers, means whereby fluid pressure may be supplied from said normal source to said potential source but not vice versa, and means for controlling the supply of fluid from said potential source to said cylinder automatically in accordance with predetermined abnormal operating conditions whereby during normal operation communication between said potential source and said cylinder is shut off.

OTTO V. KRUSE.